June 18, 1935.  H. R. LONTZ  2,005,502
BEARING
Filed March 14, 1934
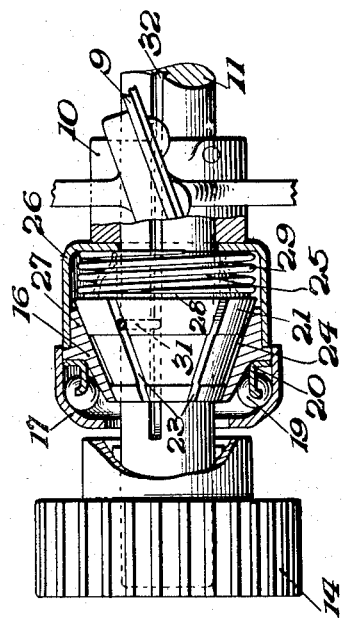
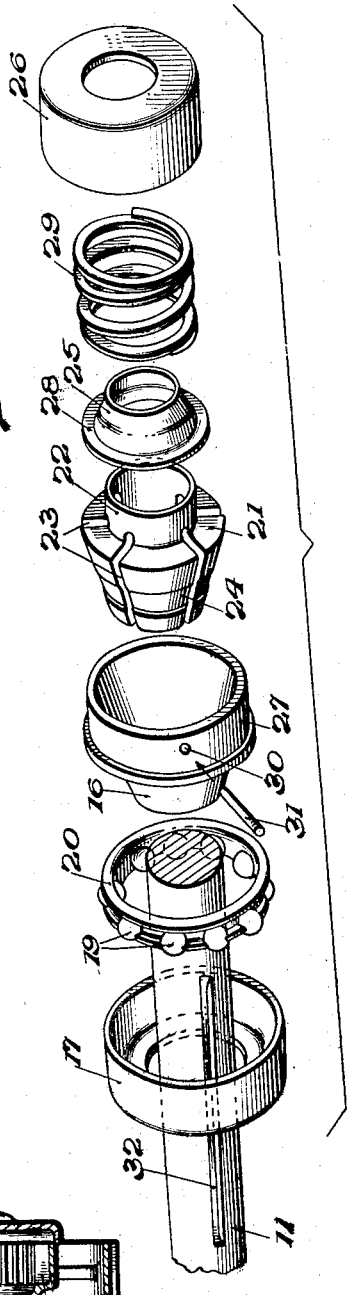
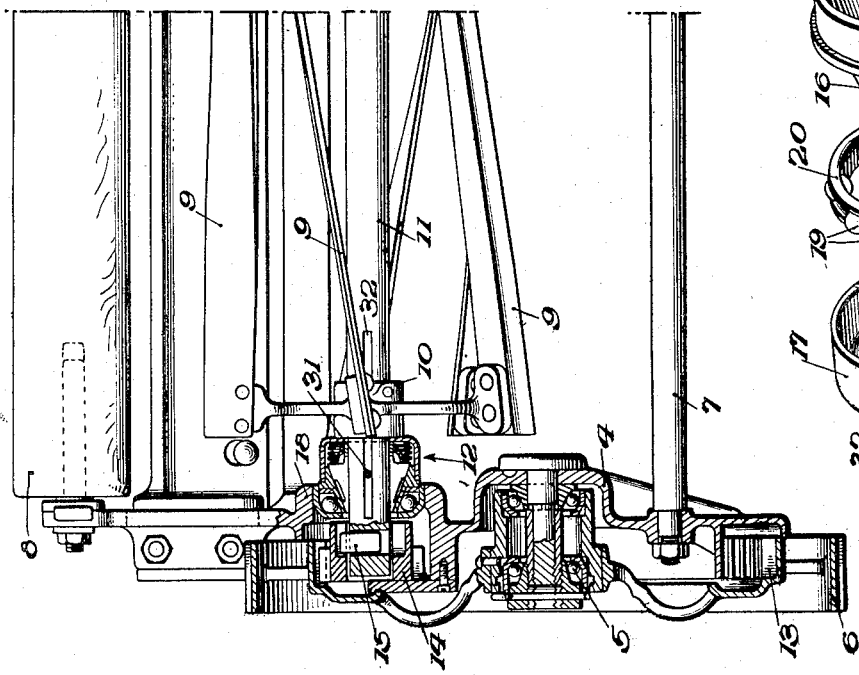
INVENTOR
*Harry R. Lontz*
BY
*Cameron, Kerkam & Sutton* ATTORNEY Patented June 18, 1935

2,005,502

UNITED STATES PATENT OFFICE 2,005,502

BEARING

Harry R. Lontz, Richmond, Ind., assignor to The F. & N. Lawn Mower Company, Richmond, Ind., a corporation of Delaware Application March 14, 1934, Serial No. 715,538

4 Claims. (Cl. 308—197)

This invention relates to bearings, and more particularly to self adjusting bearings for the shafts of lawn mower cutting mechanisms.

In U. S. Patent No. 1,298,980, issued to John M. Lontz on April 1, 1919, and in my own prior Patent No. 1,530,086, dated March 17, 1925, there is disclosed a self adjusting bearing for lawn mowers of the character to which the present invention relates wherein a resilient bearing sleeve not only coacts, under the influence of a spring, with the bearing members to take up any lost motion therebetween but also grips the shaft or other supporting member, when a proper bearing pressure has been obtained, to prevent the force of the spring from being exerted on the bearing itself. In this form of bearing, the resilient bearing sleeve is preferably mounted directly upon the shaft while the rotatable race member of the bearing telescopes over the sleeve, both the sleeve and race member being connected to the shaft for rotation therewith and longitudinal movement relative thereto by means of a pin passing through a hole in the shaft with its ends engaging longitudinal slots formed in both the sleeve and the race member.

The sleeve of such a bearing is substantially frusto-conical in shape and is formed with a relatively thin wall which is rendered resilient by the provision of a plurality of circumferentially spaced longitudinal slots therein. These slots are arranged in pairs diametrically opposite one another so that when the retaining pin is driven through the shaft both ends thereof will engage slots in the sleeve. The rotatable race member is also provided with at least one pair of diametrically opposite slots for the same purpose.

After bearings of this character had been in use for a substantial period of time, it was found that a number of the instances of bearing trouble occurring during service were directly traceable to the splitting or breaking of the resilient bearing sleeve at the time when the retaining pin was driven into place during the assembly of the bearing. In assembling these bearings, the slots on one side of the sleeve and rotatable race member could be carefully alined with the hole in the shaft through which the pin was to extend, but the passage of the latter through the slots on the other side would be blind. Consequently, in some instances the pin would strike the edge of one of the thin walled sections of the slotted sleeve and crack or break the sleeve, a defect which would not be discovered until some time after the mower was placed in service.

It was first proposed to remedy this difficulty by entirely omitting the retaining pin and relying upon the frictional engagement between the shaft and split sleeve, and between the sleeve and rotatable race member, to maintain these three elements in their proper, relatively non-rotatable assemblage. However, this expedient proved impracticable because dirt and other foreign matter would find its way into the bearing and bind the parts, whereupon the shaft would turn within the sleeve, or the sleeve within the race member, resulting in cutting of the shaft and the equivalent of lost motion in the bearing.

It is therefore one of the objects of the present invention to provide an improved self adjusting bearing of this character wherein the resilient sleeve and rotatable race member are fixed to the shaft for rotation therewith by novel retaining means the use of which in no way endangers the strength of said parts.

Another object is to provide new and improved means for fixing the sleeve and rotatable bearing race of a lawn mower bearing to the shaft thereof in non-rotatable but axially movable relationship, which means are extremely simple in structure and require engagement of said elements at but one point in their peripheries, thereby avoiding the defects of the devices hitherto known and used in the practical art.

A further object is to provide novel retaining means for the elements of a self adjusting bearing which render assembly of the bearing an easier and quicker procedure than heretofore and also avoid any possibility of injury to the parts during such assembly.

These and other objects will appear more fully from a consideration of the detailed description of the invention which follows.

In the accompanying drawing, which illustrates the preferred embodiment of the invention and wherein like reference characters indicate like parts throughout the several views:

Fig. 1 is a partial plan view of a lawn mower embodying one form of bearing including the present invention, some of the parts being broken away for purposes of clearer illustration;

Fig. 2 is an enlarged side view of the bearing of Fig. 1, partly in section; and Fig. 3 is a perspective view showing the several parts of the bearing of Fig. 2 pulled out or extended one from another so as to more clearly indicate the detailed construction of each.

Referring now to Fig. 1, the reference character 4 indicates one of the side frames of a lawn mower in which is journalled in a bearing 5 of any suitable construction a ground wheel 6. Side frame 4 is shown connected with the opposite side frame (not shown) by a connecting rod 7, while between the two side frames is supported the usual ground roller 8.

The rotary cutter blades 9 of the mower are suitably secured at each end to a hub 10, the latter being fixedly secured in any desired manner to a shaft 11. Each end of shaft 11 is journalled in one of side frames 4 in a self adjusting bearing, indicated generally at 12, embodying the present invention. Shaft 11 may be driven from ground wheel 6 by means of an internal annular gear 13 carried by said ground wheel and a pinion 14 which meshes with said gear and is so mounted on the end of shaft 11 as to be drivingly connected therewith when rotated in one direction but freely rotatable relative thereto in the other direction. In the form shown, a pawl 15 is mounted in a recess at the end of shaft 11 and positioned to engage suitable teeth formed on the interior of the hub of pinion 14, driving engagement between said teeth and the pawl taking place only when the pinion is rotated in one direction.

Referring now more particularly to Figs. 2 and 3, the improved bearing of the present invention comprises, in its preferred form, a rotatable bearing member 16, preferably constituting the inner raceway of a ball bearing, an outer bearing member or raceway 17 which is fixed within a boss 18 formed in side frame 4, and a plurality of friction reducing members or balls 19 which are maintained in properly separated and controlled positions between raceways 16 and 17 by a suitable cage 20. Both the inner surface and the outer bearing surface of member 16 are frusto-conical in shape, the convergence of said surfaces being toward the outer end of shaft 11.

Interposed between shaft 11 and rotatable bearing member 16 is a resilient sleeve 21 comprising a collapsible body of relatively thin metal having an inner cylindrical surface adapted to frictionally engage the surface of shaft 11 and an outer frusto-conical surface adapted to similarly engage the inner surface of bearing member 16. The inner cylindrical surface of sleeve 21 is provided by a continuous hub or collar 22 which closely fits shaft 11, while the resiliency of the main body portion of the sleeve is provided by a plurality of circumferentially spaced slots 23 which preferably extend the entire length thereof and for a short distance into the collar 22. In the present invention it is not essential that the slots 23 be arranged in pairs diametrically opposite to one another as was necessary in the prior structures above referred to.

Sleeve 21 is preferably machined out of a relatively hard metal, for example steel, the slots 23 being formed therein by any suitable metal cutting device. The outer surface of said sleeve is also preferably provided, intermediate the ends of the slots therein, with a circumferential groove or channel 24 formed by cutting a recess therein. The outer bearing surfaces of said sleeve, extending from the groove or channel 24 to the ends of the sleeve, preferably have a total area greater than the area of said groove, the width of groove 24 being less than the combined width of the outer bearing surfaces bounding said groove and preferably less than one-half the length of the outer frusto-conical surface of the sleeve. The arms or sections of the sleeve formed by slots 23 thus have outer bearing surfaces extending over more than one-half the length of said arms, the total area of these surfaces being greater than the area of groove 24.

The said sleeve is rendered flexible or resilient because of the slots formed therein, and is adapted to firmly grip the shaft 11 upon the application of a slight inward pressure to the outer surface thereof.

Closely fitting the collar 22 of sleeve 21 is a ring or thimble 25, while in engagement with hub 10 is an annular cup-shaped casing 26 which is so formed as to extend outwardly over and enclose thimble 25 and portions of sleeve 21 and rotatable bearing member 16. Preferably, bearing member 16 is provided with an inwardly projecting flange portion 27 having a cylindrical surface with which the outer edge of casing 26 has frictional engagement. Positioned within casing 26, and interposed between a flange 28 formed on thimble 25 and the inner wall of casing 26, is a coiled compression spring 29. This spring, acting through thimble 25 and sleeve 21, serves to move the bearing member 16 outwardly into firm engagement with the bearing balls 19, thereby continually adjusting the bearing members to their proper operative positions and compensating for wear therein. The construction of sleeve 21 is such that it prevents the spring 29 from exerting too great a pressure on bearing member 16. As previously stated, the sleeve tends to firmly grip the shaft 11 when pressure is applied to its outer surface; and the result is that, as soon as spring 29 acts, its pressure is applied not only to the bearing member 16 but also by reaction to the outer surface of the sleeve, thus causing the sleeve to grip the shaft and limit further movement. By forming the sleeve with the circumferential groove 24, the air pocket provided thereby effectively prevents any tendency of the sleeve to adhere to the inner conical surface of bearing member 16 and thus insures that the device shall perform its gripping function.

For successful operation of a bearing of this character, it is necessary that sleeve 21 and bearing member 16 both be capable of longitudinal axial movement relative to shaft 11 and at the same time rotate therewith as a unit. In the bearings hitherto known this relatively non-rotatable, axially movable assemblage of shaft, sleeve and bearing member was attained by providing flange portion 27 of bearing member 16 with a pair of diametrically opposite elongated slots which, when the bearing was assembled, were adapted to register with two of slots 23 formed in sleeve 21, and by driving a pin entirely through the shaft and through all four of the alined slots. However, as has previously been pointed out, in assembling a bearing of this construction it was necessary to drive the pin through the shaft blindly, and in some instances the pin would strike against the edges of the relatively thin arms or sections of sleeve 21 on the far side of the shaft and would split or break the same. In the present invention, all danger of such splitting or breaking is avoided by using retaining means which engage the bearing member 16 and sleeve 21 at one point only in their peripheries and which do not require the passage of a pin entirely through the shaft.

In the form shown, the flange portion 27 of bearing member 16 is provided with a suitable radial hole 30 which is adapted to receive a relatively short retaining pin 31, the latter being adapted to pass through one of grooves 23 in sleeve 21 and to engage at its inner end in an elongated, axially extending groove 32 formed in the surface of shaft 11. With this construction, pin 31 engages the relatively fragile sleeve 21 at only one point in its periphery, and all danger of injury to said sleeve during assembly is avoided since hole 30 may be quickly and accurately alined with one of grooves 23 and with groove 32 of shaft 11, whereupon pin 31 may be easily driven into place through openings in the various members which it is known are in alinement.

There is thus provided by the present invention a new and improved arrangement for assembling and maintaining the elements of a self adjusting bearing in their proper relationship, which arrangement is extremely simple in structure and avoids the known defects of devices of the same general character heretofore in use. Not only do the novel retaining means of the present invention constitute the solution to a long standing problem in the practical art, but they also provide a bearing which can be assembled more easily and quickly than the construction upon which it is an improvement.

While, for the purpose of illustration, one embodiment of the invention has been shown and described in detail, it will be understood that the invention is not limited to the exact structure disclosed but is capable of a variety of mechanical embodiments. Likewise, although the disclosure has been specifically directed to a bearing for the shaft of the rotating cutting mechanism of a lawn mower, it is obvious that the invention is not limited to this use, but that the improved bearing may be used in association with the ground wheels of a mower as well, or wherever else a self adjusting bearing of this character is suitable. Reference is therefore to be had to the appended claims for a definition of the scope of the invention.

What is claimed is:

1. In a self adjusting bearing for a rotatable member of the type including a fixed bearing member, a rotatable bearing member, a spring adapted to move said rotatable bearing member relatively to said fixed bearing member and a resilient sleeve interposed between said spring and said rotatable bearing member for controlling the application of power of said spring, means engaging said rotatable member, sleeve and rotatable bearing member at one point only in their respective peripheries for connecting said members together for rotation as a unit, said means being so constructed and arranged that said rotatable bearing member and sleeve are also capable of movement axially with respect to said rotatable member and to one another during operation under the action of said spring.

2. In a self adjusting bearing for a rotatable member of the type including a fixed bearing member, a rotatable bearing member, a spring adapted to move said rotatable bearing member relatively to said fixed bearing member and a resilient sleeve interposed between said spring and said rotatable bearing member for controlling the application of power of said spring, means for connecting said sleeve and rotatable bearing member to said rotatable member for both rotation therewith and axial movement relatively thereto and to each other during operation comprising an axially extending groove formed in said rotatable member, an axially extending slot formed in said sleeve, and a retaining member carried by said rotatable bearing member and engaging both said slot and said groove.

3. In a self adjusting bearing for a shaft of the type including a fixed bearing member, a rotatable bearing member, a spring adapted to move said rotatable bearing member relatively to said fixed bearing member and a resilient sleeve interposed between said spring and said rotatable bearing member for controlling the application of power of said spring, means for connecting said sleeve and rotatable bearing member to said shaft for both rotation therewith and axial movement relatively thereto and to each other during operation comprising an axially extending groove formed in the periphery of said shaft, an axially extending slot formed in said sleeve, and a retaining member radially movable but otherwise fixed with respect to said rotatable bearing member and engaging both said slot and said groove.

4. In a self adjusting bearing for a shaft of the type including a fixed bearing member, a rotatable bearing member, a spring adapted to move said rotatable bearing member relatively to said fixed bearing member and a resilient sleeve interposed between said spring and said rotatable bearing member for controlling the application of power of said spring, means for connecting said sleeve and rotatable bearing member to said shaft for both rotation therewith and axial movement relatively thereto and to each other during operation comprising an axially extending groove formed in the periphery of said shaft, a plurality of circumferentially spaced, axially extending slots formed in said sleeve, a radially extending hole formed in said rotatable bearing member, and a relatively short pin extending through both said hole and one of said slots and having its inner end engaged in said groove.

HARRY R. LONTZ.